United States Patent [19]
Vogel

[11] 3,957,225
[45] May 18, 1976

[54] CARTRIDGE LATCHING MECHANISM

[75] Inventor: Gregory Gene Vogel, Loveland, Colo.

[73] Assignee: Hewlett-Packard Company, Palo Alto, Calif.

[22] Filed: May 5, 1975

[21] Appl. No.: 574,680

[52] U.S. Cl. ............................... 242/198; 360/96
[51] Int. Cl.² ................. G03B 1/04; G11B 15/32; G11B 23/04
[58] Field of Search .................. 242/197–200, 242/55.19 A; 360/93, 96; 352/72–78 R; 95/31

[56] References Cited
UNITED STATES PATENTS

| | | | |
|---|---|---|---|
| 3,543,664 | 12/1970 | Kremp et al. | 95/31 |
| 3,628,754 | 12/1971 | Fujikawa | 242/198 |
| 3,656,704 | 4/1972 | Ogura | 242/198 |
| 3,692,257 | 9/1972 | Righi | 242/198 |
| 3,811,758 | 5/1974 | Riedel | 352/74 X |
| 3,863,267 | 1/1975 | Fujinaka | 360/93 |

*Primary Examiner*—Leonard D. Christian
*Attorney, Agent, or Firm*—Ronald E. Grubman

[57] ABSTRACT

A cartridge latching mechanism is provided in which a few simple elements function to position and latch a tape cartridge into a housing containing driving elements for the tape cartridge and magnetic heads for reading and writing on the tape. Manual insertion of the cartridge rotates the latching mechanism about a pivot point whereupon a spring force engages to create a torque which positively engages the cartridge and latches it into position. Depression of an eject button disengages the latching mechanism and rotates it in an opposite direction, whereupon the same spring generates an oppositely directed torque to positively eject the cartridge.

5 Claims, 5 Drawing Figures

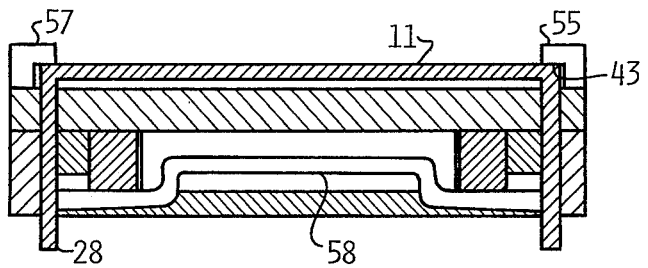
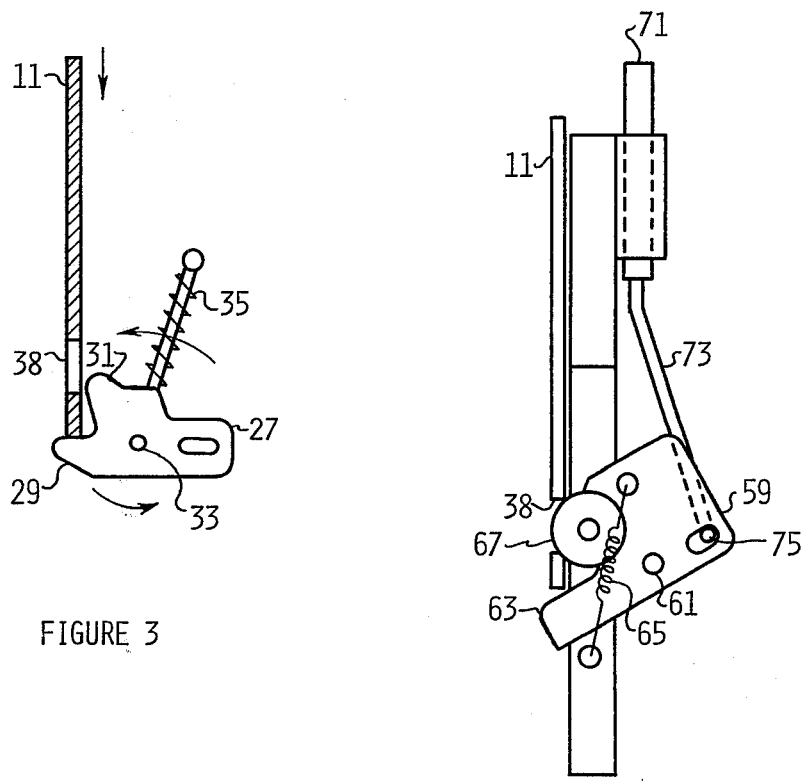

CARTRIDGE LATCHING MECHANISM

BACKGROUND OF THE INVENTION

Cartridge type magnetic tapes are finding increasing applications in connection with computing and calculating devices as well as with more conventional recording and dictating machines. For many of these applications in which accuracy and reproducibility are strict requirements, it is important that the cartridge be precisely maintained in contact with the driving mechanism used to advance the tape.

In devices known in the prior art, it is typical that the tape cartridge is placed in an enclosure (e.g., a cover) which is then snapped into position to hold the cartridge. These devices require various cams, levers, hinges, tension springs and other moving parts to grasp and position the cartridge. In other known devices, the cartridge is inserted and held stationary while a driving motor is itself rotated into position against the cartridge. These devices require the moving of a bulky motor and typically also require additional mechanical elements to grasp the cartridge.

It would therefore be desirable to have a simple mechanism which positions the data cartridge securely and reliably against its driving mechanism and which also serves to disengage and eject the cartridge when desired.

SUMMARY OF THE INVENTION

In accordance with the illustrated preferred embodiments, the present invention provides a cartridge latching mechanism which may be simply activated to engage and register a tape cartridge, and to securely hold the cartridge in a fixed position against a driving capstan. The latch utilizes a spring which, when positioned on one side of a pivot point, exerts a torque tending to rotate the latch in one direction to engage and position the cartridge. When positioned on an opposite side of the pivot point, the spring produces an oppositely directed torque tending to eject the cartridge. In preferred embodiments of the invention, an initial manual insertion of the cartridge engages the latch in the positioning mode, while a manual force exerted on an eject button serves to engage the latch in the eject mode.

DESCRIPTION OF THE DRAWINGS

FIG. 3 is a view of a latching mechanism according to the invention showing operation of the latch.

FIG. 4 is a cross-sectional view taken along the line BB of FIG. 2 to better illustrate cartridge guides against which the cartridge is positioned.

FIG. 5 is a schematic illustration of another preferred embodiment utilizing a tensioning spring to provide latching and ejecting forces.

DETAILED DESCRIPTION OF THE PREFERRED EMBODIMENT

Figure 1:
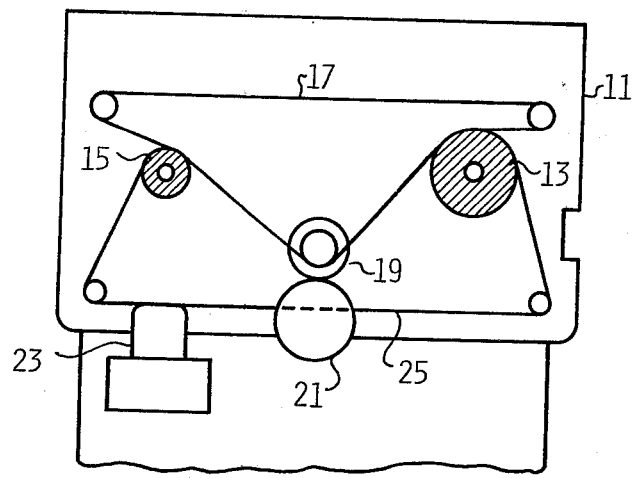
FIG. 1 is a top view of a magnetic tape cartridge positioned against a driving capstan and magnetic recording head.
Figure 2:
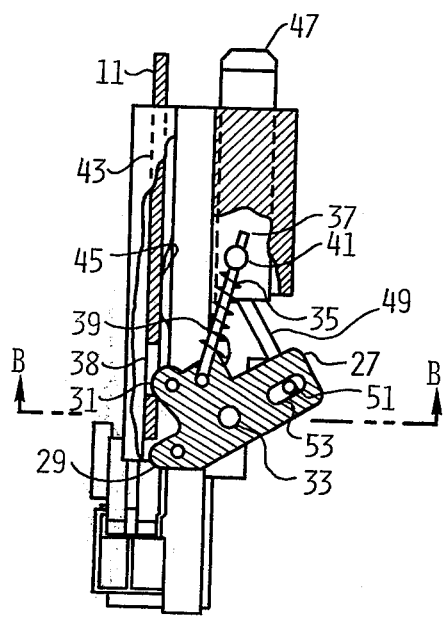
FIG. 2 is a side view in cross section of a magnetic tape cartridge latched in position by a mechanism according to an embodiment of the invention.

In FIG. 1 there is illustrated a tape cartridge unit 11. For illustrative purposes, the unit is shown as being of the type in which recording tape 25 is wound and unwound from a pair of rollers 13 and 15 being driven by a continuously circulating belt 17. Circulating belt 17 is itself driven by a pully 19 which is in contact with a capstan 21 connected to a driving mechanism such as a motor (not shown). A recording head 23 is illustrated as being in contact with a portion of recording tape 25. For accurate and reproducible recording onto the tape and reading from the tape it is important that cartridge 11 be always positioned determinably so that roller 19 is in contact with capstan 21. This requires that the cartridge be positioned firmly against the capstan in a direction along the cartridge plane. It is also important for reliable recording that there be substantially no out-of-plane "tilt" of the cartridge with respect to recording head 23. Both of these requirements are simply achieved by a latching mechanism according to the present invention. In FIG. 2, there is illustrated in cross section a side view of a preferred embodiment of the invention. Cartridge 11 is shown as being in the inserted "latched" position. According to this preferred embodiment the cartridge is latched by means of a latch mechansim 27 which includes a pair of protruding sections, or tangs, labeled 29 and 31. Latch 27 is hinged to rotate about a pivot 33. A spring element 35 rides on a spring-guide 37 and exerts a compressional force on a surface 39 of latch 27. In the illustrated latched position spring 35 is compressed between surface 39 of latch 27 and a pivot guide 41 into which spring guide 37 is allowed to freely pass. The spring is compressed and exerts a downward force on latch 27. This force is transmitted to cartridge 11 through tang 31, which engages latch 27 in a slot 38. It can be seen that the spring force includes a downward component which tends to force cartridge 11 into a desired position against capstan 21; this locks capstan 21 into contact with pulley 19. The spring force also includes a horizontal component (to the left in FIG. 2) which is also transmitted by tang 31 and tends to drive cartridge 11 securely against a shoulder 43 (illustrated more clearly in FIG. 4). This aligns the cartridge and prevents tilt. To help support cartridge 11, a flat spring 45 or other supporting element may be included toward the rear of the cartridge. In this position a latching mechanism according to the invention will securely position the cartridge in both the horizontal and vertical planes as desired.

In FIG. 3 there is illustrated the position of the device momentarily before the cartridge is securely latched into the position illustrated in FIG. 2. It can be seen that as cartridge 11 is manually presssed downwardly it engages tang 29 tending to rotate the tang counterclockwise. As tang 29 rotates, so rotates latch 27. When latch 27 has rotated to a position where the center line of spring 35 is to the left of pivot 33, the force of spring 35 will exert a downward force causing a counterclockwise torque of the latch about pivot point 33. The latch will therefore continue to rotate until tang 31 engages a slot 38 in the cartridge, thereby driving the cartridge forcibly into position. An operator manually inserting the cartridge into position then feels a secure "snap" as the cartridge is driven into place.

Referring again now to FIG. 2, there is shown an eject button 47. When a manual force is exerted on the button in a downward direction, a component of that force is transmitted through an eject rod 49 to a pin 51 fastened to the end of the eject rod. Pin 51 rides in a slot 53 of latch 27. As a manual downward force is exerted on eject button 47, pin 51 slides down slot 53 exerting a downward force on latch 27. The latch therefore begins to rotate clockwise about its pivot point 33. As the latch rotates spring guide 37 shifts position until its axis is pointing downwardly on the right side of pivot point 33. The compression force of spring 35 therefore exerts a clockwise torque on latch 27 tending to rotate the latch clockwise. Tang 29 then rotates into engagement with the bottom surface of cartridge 11 and positively forces the cartridge upwardly; the net result is to positively eject the cartridge. Thus, according to the invention, the same latch mechanism which engages to positively latch the cartridge into position and retain it there, also functions to positively eject the cartridge when the eject button has been depressed; no separate eject mechanism is required.

In FIG. 4, cartridge 11 is shown positioned securely against a pair of cartridge guides 55 and 57. The shoulder 43 of guide 57 which was mentioned above may now be seen in more detail. Latch 27 is shown in cross section as well as a second identical latch 28 positioned to engage an opposite edge of cartridge 11. In this embodiment, an eject rod 58 is responsive to an eject button such as is discussed above.

In FIG. 5 there is again illustrated a cartridge 11 including a slot 38. A latch 59 pivots about a pivot point 61 in a manner similar to that described above in connection with the previous figures. In this embodiment there is included an arm 63 which is engaged by cartridge 11 as the cartridge is manually pressed in a downwardly direction. As the latch rotates about its pivot point, a tension spring 65 exerts a force creating a counterclockwise torque about the pivot point. A roller 67 thereby engages slot 37 of cartridge 11 and forcibly positions the cartridge to the left and latches it into position. Ejectment of the cartridge is also effected by the same mechanism. To eject the cartridge, an eject button 71 is manually depressed to exert a downward force on latch 59 by means of a rod 73 and a pin 75. This force begins to rotate latch 59 clockwise until tension spring 65 is positioned to the right of pivot point 61. At that point, the force of the tension spring creates a clockwise torque of the latch about its pivot point thereby positively ejecting cartridge 11. As in previously described embodiments, the same mechanism which engages and holds the cartridge may be activated to eject it.

I claim:

1. A mechanism for latching a tape cartridge inserted into a housing, comprising:
    latch means mounted for rotation about a pivot point, for engaging the tape cartridge and latching the cartridge into the housing in response to rotation of said latch means in one direction, and ejecting the cartridge from the housing in response to rotation of said latch means in another direction opposite said one direction; and
    spring means mounted in spatial relation with said latch means for exerting spring forces on said latch means to produce a torque thereon in said one direction when an axis of said spring means is aligned on one side of said pivot point to positively engage the cartridge and position it in the housing, and a torque in said other direction when said axis is aligned on an opposite side of said pivot point to positively eject the cartridge from the housing.

2. A mechanism as in claim 1 wherein said spring means is mounted for exerting spring compressional forces on said latch means.

3. A mechanism as in claim 1 wherein said spring means is mounted for exerting spring tension forces on said latch means.

4. A mechanism as in claim 1 wherein said latch means is activated in said one direction to positively engage and latch the tape cartridge by contact with the inserted tape cartridge to initiate rotation of said latch means in said one direction.

5. A mechanism as in claim 4 further comprising:
    eject means for activating said latch means to positively eject the cartridge by initiating rotation of said latch means in said other direction.

* * * * *